July 23, 1935.  L. H. STEIN  2,009,281

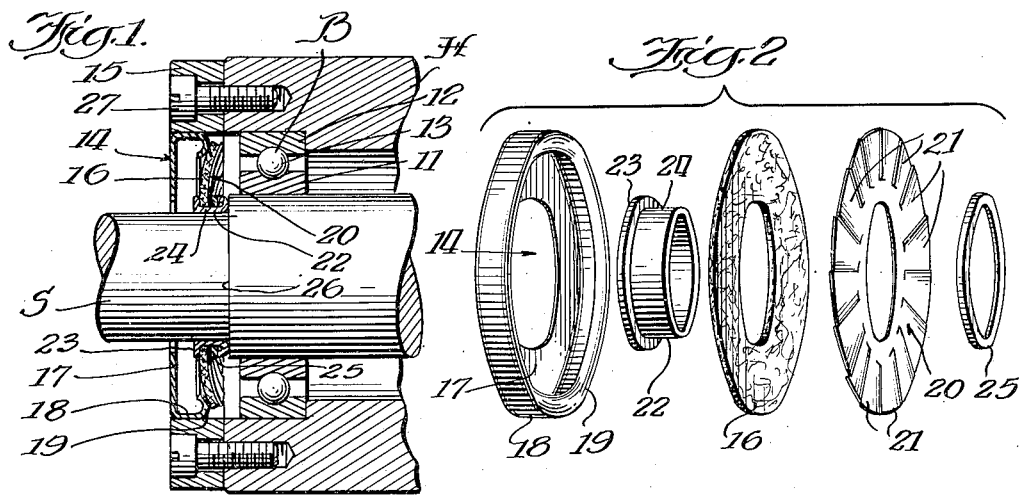
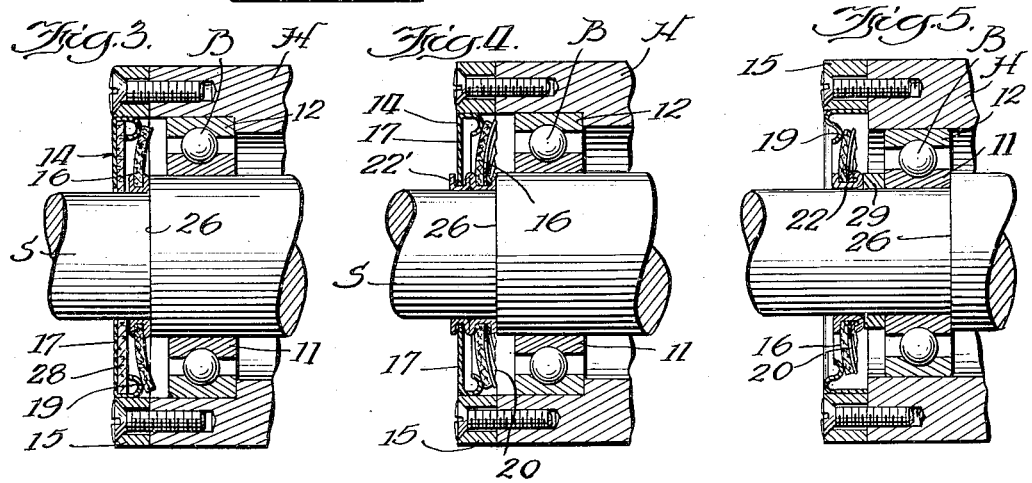
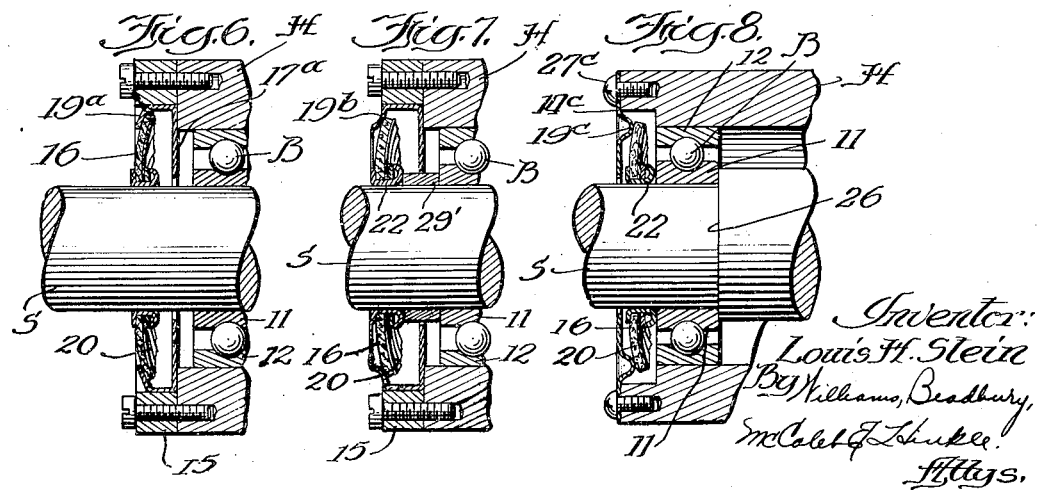

FLUID SEAL FOR ROTARY SHAFTS

Filed Oct. 15, 1932  2 Sheets-Sheet 2

Inventor:
Louis H. Stein
By Williams, Bradbury,
McCabe & Hinkle, Attys.

Patented July 23, 1935

2,009,281

UNITED STATES PATENT OFFICE 2,009,281

FLUID SEAL FOR ROTARY SHAFTS

Louis H. Stein, Chicago, Ill., assignor to Aetna Ball Bearing Manufacturing Company, Chicago, Ill., a corporation of Illinois Application October 15, 1932, Serial No. 637,889

13 Claims. (Cl. 286—5)

My invention relates to the so-called rotary seals, that is, fluid seals for rotary shafts. It is particularly designed as a liquid lubricant seal for shafts in connection with the lubrication of rotary or ball bearings, although its use is not thus limited and it can be used for sealing against loss of other liquids or gases.

One feature of my invention is that the flexible sealing member is mounted to rotate while the seat remains stationary, and thus the rotary element may also serve the function of an "oil slinger".

Another feature of my invention is a generation of a slight inward suction at the seal such that if there be any leakage it will be inward rather than outward, and consequently no oil or other fluid will be lost. I also provide means for preventing the ingress of dust or other foreign matter as a result of such slight inward suction at the seal.

A further object of my invention is simplicity in the design, economy of manufacture and ease of assembly of the rotary seal.

Another object of my invention is the provision of a simple seal structure which can be incorporated as a unit with the ball bearing or roller bearing assembly.

A still further object of my invention is concerned with the provision of a stop for accurately controlling the position of the seal members axially of the shaft and housing.

The foregoing, together with further objects, features and advantages of my invention are set forth in the following description of specific embodiments of my invention as are illustrated in the accompanying drawings wherein:

Fig. 1 is a fragmentary longitudinal section of a shaft, housing and ball bearing assembly embodying one form of my rotary seal;

Fig. 2 is an exploded perspective view of the several parts constituting the rotary seal;

Figs. 3, 4, 5, 6, 7 and 8 are modified forms of the invention shown in Fig. 1;

Figure 9:
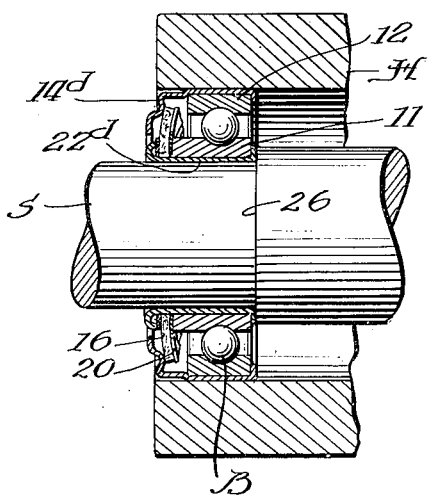
Figs. 9 and 10 are other modifications wherein the ball bearing assembly and the rotary seal are made as a unit.

In Fig. 1 the shaft S is journalled in the end of a housing H by the conventional ball bearing assembly B which consists of an inner race 11 on the shaft, the outer race 12 in the bore of the housing H and the balls 13 between the races.

The rotary seal assembly comprises in general a stationary seat ring 14 press-fitted into and carried by a mounting ring 15, and a rotary sealing member 14, in the form of a yielding washer-shaped disc or pressure plate, carried on the shaft.

The seat ring 14, which may be formed from sheet metal, comprises a flat ring portion 17 which for convenience of assembly may, when positioned, come flush with the outer face of the retaining ring 15. At the outer edge of the flat portion 17, the seat ring 14 carries an inwardly directed marginal flange 18 cylindrically formed for press fit into the inner bore of the retainer ring 15. The inner edge of the flange 18 is rebent bead-like toward the axis of the ring 14 to form a convex annular seat 19.

The rotary sealing member or disc 16, which may be of leather, fiber, cork, composition felt or other suitable material, is reinforced by a yielding back plate 20 of spring metal having inwardly directed radial cuts about its periphery forming a multiplicity of individual spring fingers 21 which urge the margins of the leather sealing member 16 into sliding rotary contact with the smooth convex surface of the seat 19. The leather sealing member 16 and its backing plate 20 are clamped together at the margins of their central openings by a hub 22. The hub initially has an outer flange 23 and a cylindrical flange 24, as shown in Fig. 2. The sealing member 16 and the backing plate 20 are slipped over the cylindrical flange 24 of the hub and then a spacing washer 25 is also slipped over the hub, whereupon the inner end of the cylindrical portion 24 is spun outwardly and over against the adjacent face of the spacing washer 25, whereby the four parts of the rotary portion of the seal are assembled as a unit. The central opening of the hub 22 is conformed to afford a press fit on the shaft. As here shown the shaft has a reduced portion extending outwardly from the bearing, leaving a shoulder 26. The hub 22 is pressed on to this reduced portion of the shaft until it abuts the shoulder 26. This locates the rotary member of the seal longitudinally of the shaft. As previously explained, the stationary seat ring 14 is positioned so that its outer face comes flush with the outer face of the retaining ring 15 which is secured to the housing H by cap screws 27 or otherwise to locate the seat relative to the housing. As shown in Fig. 1, this location of the rotary and stationary parts of the seal results in the leather sealing disc 16 being flexed against the resilience of the spring fingers 21 of the backing plate, and thereby a constant pressure on the seal is maintained. It is presupposed in Fig. 1 that the relation between the housing H and the shaft S in the parts of the machine or device not here shown will afford a reasonable limit of axial play of the shaft relative to the housing. If other parts of the machine do not afford this check on end play, reliance must be had upon the bearings and if desirable the ball bearings here shown may be of the type which is calculated to take a component of axial thrust. While the give of the flexible pressure plate or sealing disc 16, together with its backing plate, will take up reasonable end play of the shaft, the end play must be checked within reasonable limits in order to maintain a fairly uniform sealing pressure.

Eccentricity of the shaft due to manufacturing inaccuracies does not affect the operation of my rotary seal, because the eccentric movement of the rotary leather sealing member or ring 16 against the seat 19 merely serves to wipe the seat.

Any lubricant or other liquid tending to flow out of the end of the housing is necessarily brought in contact with the surfaces of the rotating sealing element with the result that it picks up the rotation of the sealing element and is subject to centrifugal force which thereupon throws the liquid outwardly away from the seal. The same action of centrifugal force in throwing away the liquid which might otherwise reach the seal is also true of gases. By far the greatest area closing the space between the shaft and the housing is the back face of the rotary element of the seal. Thus there is a greater opportunity for any fluid passing out toward the end of the housing to be set in rotation by the rotary seal element. Consequently the action of centrifugal force in keeping fluid away from the seal is much more effective than if the rotary seal element presented a lesser area to the escaping fluid.

Because any fluid approaching the region of seal is thrown away by the centrifugal force, there is a tendency of the centrifugally moved fluid to form a suction upon the seal region itself with the result that if there is any passage of fluid through the seal, it is a passage inwardly and not a loss outwardly. This more positively assures that there will be no liquid flow from the housing sealed by my rotary seal. In certain installations this slight inward suction at the seal might tend to draw in dust or other foreign particles. To guard against this, the stationary seat ring 14 may conveniently support a conventional felt or cork washer which snugly fits about the periphery of the shaft. While the seal of this washer against the shaft would not be adequate to prevent the loss of liquid lubricant or other fluid, it is sufficiently tight largely to prevent the ingress of dust or other foreign particles.

In the modification of Fig. 3, such an auxiliary cork dust ring 28 is shown. It is held on the inner side of the flat disc portion 17 of the seat ring by the innermost edge of the seat forming bead 19. In the modification of Fig. 3 I have eliminated the metal backing plate 20 and rely upon the inherent resiliency of the material of the rotary sealing member itself which for this purpose may preferably be of fiber. Such a construction is in general more applicable to higher speed shafts, whereas with lower speed shafts the more localized pressures of the individual spring fingers 21 are desirable for maintaining a perfect seal.

In the constructions of both Figs. 1 and 3 the flexible rotary sealing element or disc 16 is positioned with its outer margin bent out of a plane normal to the axis of rotation. Thus when the shaft rotates, the centrifugal force to which the margin of the flexible sealing member itself is subjected tends to cause it to assume a flat plane at a normal to the axis of revolution, which results in a pressure of the rotary sealing member against the stationary seat. This pressure is a factor in addition to the normal resiliency of the rotary sealing disc and the added pressure of the backing plate. If the fluid within the housing is at a pressure greater than atmosphere, the area of the flexible sealing member 16 is subject to that pressure also which results in considerable additional force tending to hold the seal closed, thus offering a fourth seal-pressing factor.

In Fig. 4 I have shown a construction similar to that of Fig. 1 except that the hub carries a channel-shaped extension 22' which loosely embraces the margins of the central opening of the flat face portion 17 of the seat ring 14. This affords a means of loosely holding the retaining ring 15, the ring seat 14 and the rotary seal member 16 together for shipment and handling as a unit. When in operation, the outer transversely disposed flange of the channel-shaped extension 22' serves by centrifugal force to throw out any major particles of foreign matter which might otherwise be sucked inwardly toward the seal.

The modification shown in Fig. 5 is like that shown in Fig. 1 except that the seat ring is differently constructed, the seat forming bead 19 being formed in the outer flange of the seat ring rather than as an inner flange. Also, in Fig. 5 the hub 22 does not directly abut the shoulder 26 of the shaft, but instead the inner race 11 embraces the reduced portion of the shaft and its inner edge contacts the shoulder 26. The hub 22 is pressed toward the shoulder 26 but spaced by the race 11 and an auxiliary spacing washer 29 (which, if convenient, could be an integral extension of the inner race 11).

In Fig. 6 the generally channel-shaped stationary seat ring is reversed from the arrangement shown in Fig. 1, in that the short flange is outermost and the long flange innermost and the rotary sealing member rides against the inner face of the short flange. Thus the long flange 17a acts as a partition between the ball bearings and the rotary seal member 16 and the short seat forming flange 19a extends over the margin of the latter. In manufacture, the flange 19a may be spun down after the rotary seal member 16 is positioned within the stationary seat ring. The rotary and stationary units are thus loosely assembled in advance of incorporating them in a shaft and housing assembly.

Fig. 7 shows an arrangement similar to Fig. 6 except that the seat forming flange 19b is slightly beaded to present a convex seating surface. Also, in Fig. 7 a spacing sleeve 29' definitely locates the hub 22.

In Fig. 8 I have dispensed with the separate retaining ring 15 and instead, for the seat ring, I use a sheet metal disc apertured for the shaft, which is flat except for a seat forming bead 19c. The seat ring 14c extends beyond the opening in the housing H and itself is directly mounted to the housing by screws 27c. In Fig. 8 the hub 22 is positioned by directly abutting the inner race 11 which in turn abuts the shoulder 26 of the shaft. This is a more economical design to manufacture because of the elimination of the separate ring 15 and because the seat ring 14c is somewhat easier to form.

In Fig. 9 the seat ring 14d is enlarged into a shell which embraces the outer edges of the outer race 12, and the hub 22d is similarly enlarged into a shell which embraces the inner edges of the inner race 11. In this instance the seat ring 14d is not mounted on the housing by means of a retaining ring, but is directly fitted into the bore of the housing H along with the outer race 12. The advantage of the construction of Fig. 12 over those previously described is that the ball bearing assembly and the rotary seal assembly are made a unit.

Figure 10:
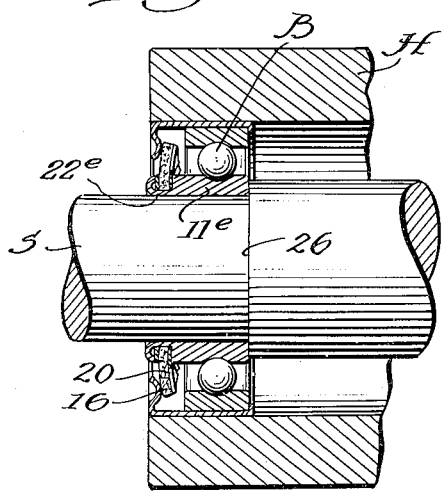

Fig. 10 shows a construction similar to that of Fig. 9 except that the hub 22e instead of being a separate member, is a turned-over cylindrical extension of the inner race 11e.

Figure 11:
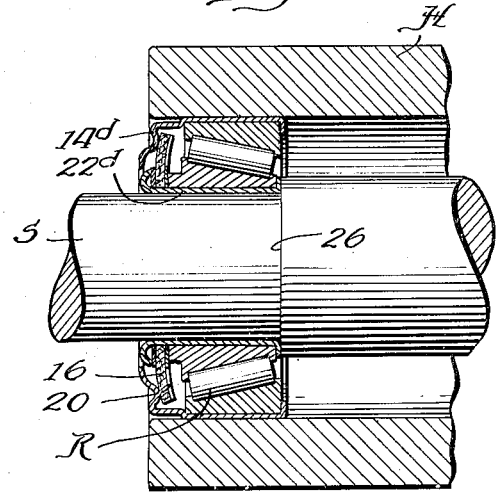
Fig. 11 shows a modification somewhat similar to Fig. 9 but showing an application to a roller bearing.

Fig. 11 shows a construction similar to Fig. 9 except that it is applied to the instance of a roller bearing.

Figure 12:
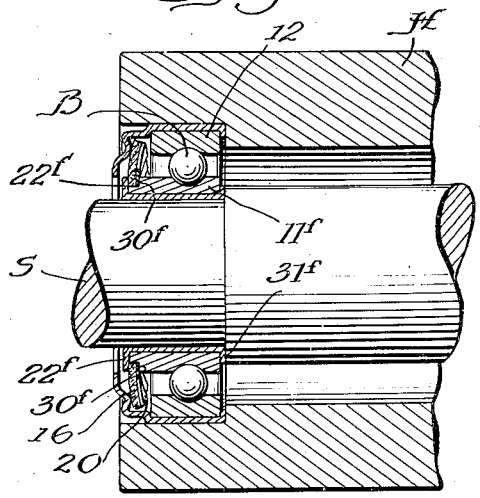
Fig. 12 is another modification similar to Fig. 9 but in which the flexible rotary sealing member is mounted in a cut-out corner of the lower race.

Fig. 12 shows a construction similar to that of Fig. 9 except that the outer flange of the hub 22f instead of being offset with the yielding material of the rotary seal member between it and the inner race, is turned over a corner of the lower race itself. The leather and back plate constituting the rotary member of the seal are set against a shoulder 30f formed in the lower race 11f and are there retained by an extension of the flange 22f. This construction makes it more feasible, in embracing the inner race with the shell, to complete the assembly by forming the flange 22f first and the offset flange 31f last.

While I have disclosed these specific embodiments of my invention, I contemplate that many changes and rearrangements may be made without departing from the scope or spirit of my invention.

I claim:

1. The combination with a hollow housing and a rotary shaft extending therethrough, of a seal between the housing and shaft comprising a rotary pressure plate carried by and sealed to the shaft and presenting an outwardly facing annular sealing surface and a stationary member of sheet metal formed in annular channel-shaped form surrounding the shaft with its web portion cylindrically conformed and its inner flange beaded to present a convex annular sealing surface engaging with said surface of the pressure plate, the housing having a cylindrical bore portion for receiving the cylindrical web of the stationary member to support it and seal it to the housing.

2. The combination with a hollow housing and a rotary shaft extending therethrough, of a seal between the housing and shaft comprising a rotary pressure plate carried by and sealed to the shaft and presenting an outwardly facing annular sealing surface and a stationary member of sheet metal formed in annular channel-shaped form surrounding the shaft with its web portion cylindrically conformed and its outer flange beaded to present a convex annular sealing surface engaging with said surface of the pressure plate, the housing having a cylindrical bore portion for receiving the cylindrical web of the stationary member to support it and seal it to the housing.

3. The combination with a hollow housing and a rotary shaft extending therethrough, of a rotary seal between the housing and shaft comprising a rotary pressure plate carried by and sealed to the shaft and presenting an outwardly facing annular sealing surface and a stationary member of sheet metal formed in annular channel-shaped form surrounding the shaft with its web portion cylindrically conformed and one of its flanges beaded to present a convex annular sealing surface in engagement with said surface of the pressure plate, the housing having a cylindrical bore portion for receiving the cylindrical web of the stationary member to support it and seal it to the housing.

4. A rotary seal comprising a stationary member adapted to be supported by and sealed to a housing and comprising an annular ring channel-shaped in radial section with a cylindrical web and inwardly extending flanges, one of said flanges being inwardly beaded to present an annular seat, and a resilient pressure ring presenting an annular face of resilient material for rotary sealing engagement with the plate and a hub embracing the pressure ring at its inner margin for mounting the pressure ring upon and sealing it to a rotary shaft extending through the housing, the outer margin of the pressure ring being embraced by said flanges whereby the pressure ring and stationary member are loosely assembled together.

5. The combination with a housing and a shaft extending therethrough, of a rotary seal between the shaft and housing comprising a stationary member carried by the housing and presenting an annular seat, a pressure ring carried by and sealed to the shaft and having an annular surface resiliently contacting the seat, the pressure ring constituting a fluid slinger for throwing fluid from within the housing away from the sealing region, whereby centrifugal force tends to create a suction at the seal region, and a second rotary seal between the housing and shaft and posterior to said first mentioned seal for preventing the ingress of dust particles through said first mentioned rotary seal.

6. The combination with a housing and a rotary shaft passing therethrough, of a rotary seal therefor comprising a resilient pressure ring surrounding and carried by and sealed to the shaft, and a stationary member formed of sheet metal and comprising an annular plate portion surrounding the shaft and disposed in a plane at a normal to the axis of the shaft, and a marginal flange extending toward the interior of the housing and radially inwardly rebent to form an annular convex seat for sealing engagement with the pressure ring, and a washer of resilient material having a central aperture snugly embracing the rotary shaft to form a dust seal therewith, the washer lying against the inner side of the plate portion and being held thereagainst by the inner end of the rebent flange.

7. A rotary seal comprising a stationary member for mounting on and sealing to a housing and a rotary pressure plate for mounting on and sealing to a rotary shaft extending through the housing, the stationary member comprising an annular plate with a rearwardly and inwardly rebent flange at its outer margin presenting a convex annular seat and the pressure plate comprising a resilient annular ring presenting a face of resilient material for sealing engagement with the seat and a hub tightly embracing the inner margin of the pressure ring to mount it on the shaft, the hub also loosely embracing the inner margin of the stationary plate for loosely assembling the stationary member with the rotary pressure plate.

8. The combination with a hollow housing having an end opening and a rotary shaft extending therethrough of a rotary seal between the housing and shaft comprising an annular plate presenting an inwardly facing seat in a plane at a normal to the axis of the shaft and convexed in radial section, attachment means radially beyond the seat for securing the plate to the housing and sealing it thereto, and a rotary pressure ring secured at its inner margin to the shaft and fixedly sealed thereto, the pressure ring presenting a face of resilient material for rotary sealing engagement with the seat.

9. In combination with an oil-containing housing having a rotary shaft journaled therein and extending outwardly therefrom through an opening in one end thereof, a rotary seal which, with the shaft, closes said opening, said seal comprising a non-rotating element fixed to the housing and presenting an inwardly facing annular seat of convexed radial section in a plane at right angles to the axis of the shaft, and a rotary element in the nature of an annular member fixedly encircling and sealed to the shaft and resiliently pressing outwardly against said seat with a rotary contact.

10. The combination with a stationary hollow housing and a rotary shaft extending therethrough and therebeyond, of a fluid seal between the housing and shaft, comprising a stationary seat member presenting an annular seat disposed in a plane at a normal to the axis of the shaft and convexed in radial section, and a sealing disc carried by and surrounding the shaft and having a hub portion fixedly sealed to the shaft, an annular face of the yielding material radially beyond the hub portion contacting the seat and rotatably slidable thereagainst, the disc being centrally dished out of a plane away from the interior of the housing whereby in tending to straighten under centrifugal force it is pressed against the seat, the seat member being fixedly sealed to the housing radially beyond the seat.

11. The combination with a hollow fluid-containing housing and a shaft rotatably mounted therein and extending therefrom, of a fluid seal between the shaft and housing, comprising a stationary annular member formed from sheet metal stock and having an inwardly facing annular seat and radially therebeyond a cylindrically conformed portion for a drive fit on the housing for mounting the member on the housing and sealing it thereto, and a normally flat and washer-shaped composite pressure plate comprising a facing of fibrous material, a backing plate of sheet spring metal radially slit inwardly from its periphery and lying against the fibrous material, and a hub formed from sheet material of channel-shaped cross section, the flanges of the channel engaging the respective faces of the fibrous material and the backing plate to clamp them together at their central openings, the hub having its inner surface conformed for a drive fit on the shaft to mount the composite pressure plate on the shaft and to seal it thereto, the facing slidably contacting the seat adjacent the outer margin of the pressure plate and radially intermediate said drive fits, the outer margins of the pressure plate being flexed backwardly toward the interior of the housing to maintain a yielding pressure on the face against the seat.

12. The combination with a fluid-containing housing and a shaft rotatably mounted therein and extending therefrom, of a liquid seal between the shaft and housing comprising a stationary member presenting an inwardly facing annular seat and a cylindrically conformed mounting surface for a drive fit with the housing fixedly to seal the stationary member to the housing, and a rotary member of washer shape mounted on and surrounding the shaft and fixedly sealed thereto, the rotary member being of composite construction, including a flexible sheet of softer material than the seat and a dishedly mounted peripherally expansible spring metal backing plate therefor, the sheet near its periphery rotatably annularly engaging the seat to form a rotary seal radially intermediate the shaft and drive fit portion of the stationary member.

13. The combination with a fixed housing and a shaft protruding therefrom, of a fixed seal presenting an inwardly facing annular seat and having, radially beyond the seat, a cylindrically conformed exterior surface portion, a mating cylindrical portion in the housing constituting a press fit therewith, and a rotary seal member surrounding and sealed to the shaft and radially beyond the shaft forming a rotary sealing contact with the seat.

LOUIS H. STEIN.